United States Patent [19]

Andersson et al.

[11] Patent Number: 4,860,849
[45] Date of Patent: Aug. 29, 1989

[54] METHOD AND APPARATUS FOR ELIMINATION OF WHEEL SPIN OF VEHICLES

[75] Inventors: Bengt H. Andersson; Kent I. Palmgren, both of Eskilstuna, Sweden

[73] Assignee: Autoliv-Cipro Aktiebolag, Eskilstuna, Sweden

[21] Appl. No.: 169,841

[22] Filed: Mar. 18, 1988

[30] Foreign Application Priority Data

Mar. 20, 1987 [SE] Sweden .................................. 8701170

[51] Int. Cl.$^4$ .............................................. B60K 31/00
[52] U.S. Cl. ..................................... 180/197; 123/333; 123/481
[58] Field of Search ................. 180/197; 123/198 DB, 123/332, 333, 351, 478, 481

[56] References Cited

U.S. PATENT DOCUMENTS 4,432,430 2/1984 Lind et al. ............................ 180/197
4,470,390 9/1984 Omori et al. ......................... 123/333

Primary Examiner—John A. Pekar
Attorney, Agent, or Firm—James E. Nilles

[57] ABSTRACT

A method and an apparatus for preventing and, at an early stage, removing wheel spin and a consequent lateral skidding of vehicles while constantly supervising and upon need reducing the momentary torque of the motor by blocking the fuel supply to one or more cylinders of the motor without influencing the optimum fuel/air relationship, whereby the skidding of a vehicle is observed as known per se and the fuel supply to one or more cylinders of the motor is/are completely inhibited in case an unacceptably great skidding is observed, by defining in a controlling means (13) a constant chain of combustions including a predetermined number of successive part-combustions of the motor, and by inhibiting, in case of an actual skidding, first one and then a successively increasing number of part-combustions of the chain of combustion, corresponding to the combustion of some specificly determined cylinders of the motor, said inhibiting being proceeded until the skidding has been brought to cease or has been reduced to an acceptable level.

11 Claims, 2 Drawing Sheets

METHOD AND APPARATUS FOR ELIMINATION OF WHEEL SPIN OF VEHICLES

BACKGROUND OF THE INVENTION

The present invention relates to a method and an apparatus for preventing wheel spin and lateral skidding of vehicles depending thereon, such as often happens when vehicles are driven on slippery and loose grounds.

Different systems have been suggested for preventing wheel spin of the driving wheels which appears when the drive force is too high for the actual ground, whereby the driving wheels start rotating with a higher peripheral speed than the speed corresponding to the movement speed of the vehicle. One such known system operates according to the principle that the peripheral speed or the rotary speed of the driving wheels is compared with the actual driving speed of the vehicle, which driving speed is for instance observed on the idle running wheels, and that the output torque of the motor is reduced when the driving wheels have a peripheral speed which is a multiple higher than that of the idle running wheels or of any other reference object indicating the running speed of the vehicle.

The Swedish patent having the laid out publication number 445.572 shows and describes a system of the above mentioned type, which is in particular adapted to internal combustion engines of the Otto type and having a fuel injection apparatus, and the system operates so that the amount of fuel supplied to one or more cylinders is reduced step by step to a level which is determined by the rate of speed difference between the driving and idle running wheels. To achieve this fuel reduction the amount of fuel supplied to some cylinders is gradually choked by means of a valve which gradually reduces the fuel to be supplied to the fuel injection valve or nozzle until the choking is complete. Thereby the actual cylinder or cylinders are supplied with a reduced amount of fuel, whereby said cylinder or cylinders consequently give a reduced contribution of torque.

This known system is disadvantageous in some respects. Firstly the system is intended for and adapted to gasoline motors having fuel injection means and it can not be utilized in Otto motors of carburettor type or in Diesel engines. Further, the gradual choking of the fuel supply to one cylinder changes the optimum relationship between fuel and air, since always the same large amount of air is supplied to the actual cylinder independently of the amount of supplied fuel. This changed optimum fuel/air relationship leads to an impaired combustion, an un-economical utilization of the fuel, a risk of overheating of a cylinder as a result of a too lean fuel mixture, a risk that the fuel mixture does not at all become ignited and that uncombusted fuel is let out in the exhaust gas system. In the long run the said known system also may adversely influence the motor since the choking of the fuel always is made for the same cylinder during the entire stepwise choking of the fuel.

A special problem appears in motors having exhaust gas cleaning means of catalyzor type in that there is a risk that the catalyst becomes burnt out if un-combusted fuel reaches the catalyst cleaner and is ignited and burns therein.

SUMMARY OF THE INVENTION

A method and apparatus for providing an effect control system for preventing or, at an early stage, reducing or removing actual wheel spin, and this is made by a method and an apparatus that can be used in all types of motors, whether of Otto type or of Diesel type.

The invention is based on the principle that the choking of the supply of fuel to a cylinder is made without influencing the optimum fuel/air relationship in that the choking is either complete, or there is no choking at all, and in that such choking of the fuel supply can be established for one or several cylinders alternately with each other or in a systematic order.

According to the invention choking is made by establishing a chain of combustions including a predetermined number of successive unit- or part-combustions, which chain may include any optional number of combustions, and said number may be the same as or different than the number of cylinders of the motor that a complete choking is provided for with respect to one or several combustions of said chain of combustions, which will be referred to as "part-combustions". In case of an increasing choking the number of chokings is increased in the combustion chain, so that an increasing number of cylinders are excluded from combustion.

Preferably the chokings are selected so as to be at least comparatively evenly distributed along the chain of combustions, as will be more closely explained in the following.

BRIEF DESCRIPTION OF THE DRAWINGS

Now the invention is to be described more closely in connection to the accompanying drawings. In the drawings FIG. 1 diagrammatically discloses, for explanatory purposes, a diagram of the traction force and the lateral stability of a driven vehicle as a function of the percentual wheel spin.

DESCRIPTION OF PREFERRED EMBODIMENT

Figure 1:
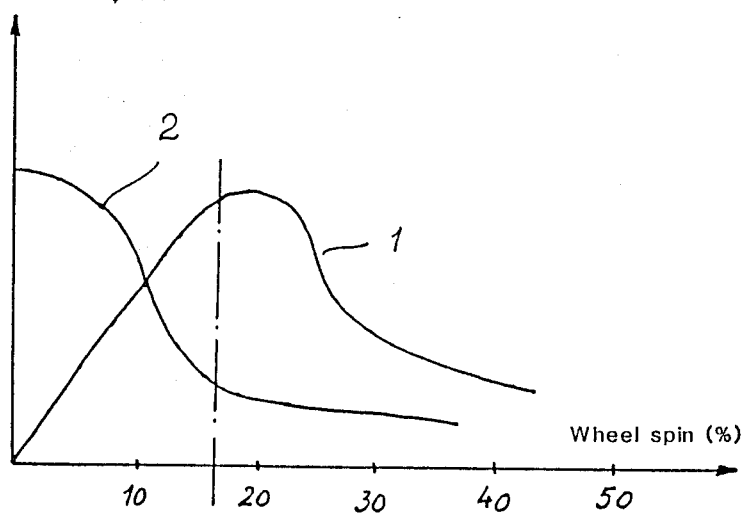

FIG. 1 shows, in the form of a diagram, how the traction force and the lateral stability of a vehicle are changed as a function of the wheel spin. By wheel spin is meant the quotient between the peripheral speeds of the driving wheels and the idle running wheels. For explanatory purposes the curves are shown only for one particular car, but it is obvious that the trend is about the same for different types of cars. The traction force and the lateral stability are plotted along the vertical axis, and the percentual value of the wheel spin is plotted along the horizontal axis. It is obvious that the traction force 1 increases from zero to a maximum, which is, in the illustrated case, equivalent to a skidding of slightly more than 20%, and that the traction force thereafter is reduced relatively quickly between 20 and 30% skidding, whereupon the curve is somewhat flattened out. The lateral stability 2, whereby is meant the resistance against skidding in the lateral direction, for instance when driving in curves, is high as long as there is no wheel spin and up to a level of about 5–8% wheel spin, whereafter the lateral stability becomes strongly reduced between about 10–30% wheel spin, and than the curve becomes flattened out.

Depending on what effect is desired the wheel spin limit therefore should be set at different spin levels. If a very good lateral stability is desired, curve 2, a skidding of up to about 5-8% may be accepted since the laterial stability curve remains relatively unchanged up to this level. If, on the contrary, a maximum traction force is desired, curve 1, and some amount of wheel spin is accepted the effect of reduction of fuel to the motor for wheel spin reducing purposes should be started closely before the top of the curve 1, for instance for a skidding of up to 15-18%. When presetting the equipement which measures the skidding it thus should be made clear what effect is desired, and the wheel spin limit should be determined from which limit a part combustion choking should be started.

Figure 2:
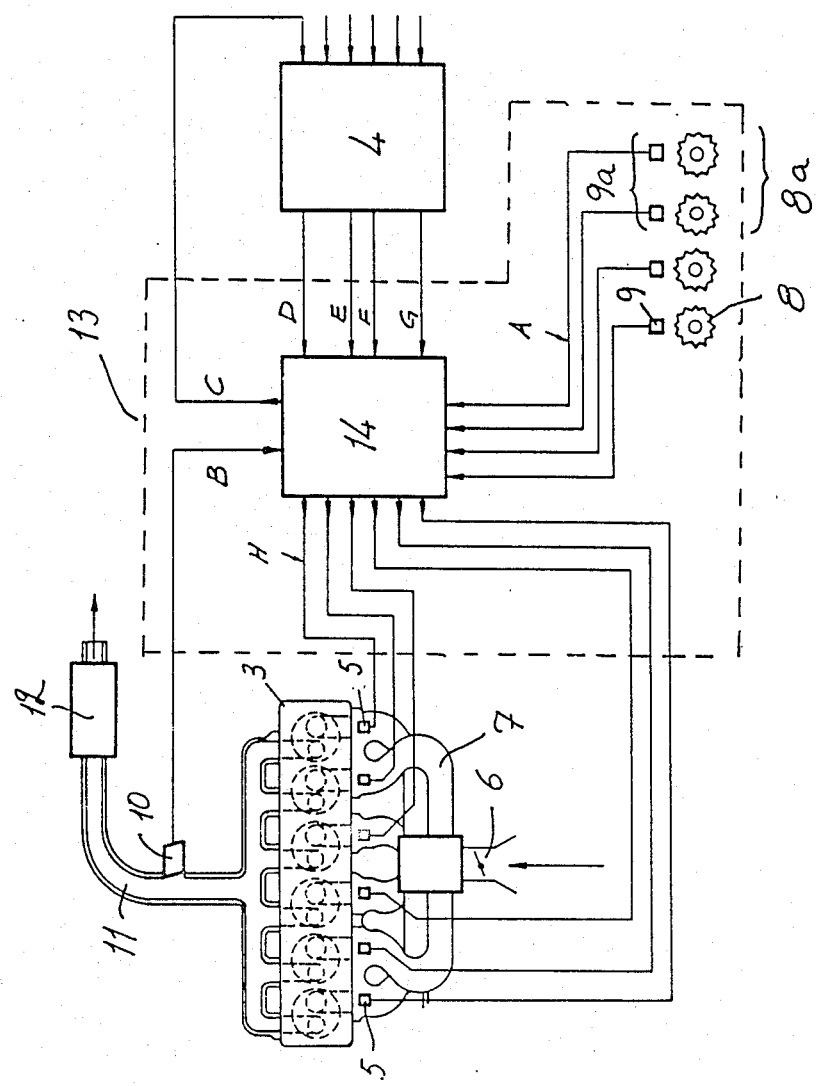
FIG. 2 diagrammatically shows an internal combustion engine having a fuel injection system and designed for being capable of performing the method of the invention.

FIG. 2 shows a system for executing the method according to the invention, and generally comprising a internal combustion engine 3, for instance an Otto Motor, having an electronic fuel injection unit 4 which by means of fuel injection valves or nozzles 5 injects fuel in a mixing chamber for each cylinder. Ar air baffle 6 determines the amount of air to be introduced in the induction pipe 7 of the motor and from there into the cylinders. A lambda probe 10 is, as known per se, connected to the exhaust gas tube 11 of the motor in order to give an indication of the combustion and thereby of the relationship between fuel and air of the supplied fuel/air mixture. In the illustrated case the motor is also formed with a catalyzator means 12 for cleaning of the exhaust gases. Said catalyzator means is not necessary for the invention, but on the other hand the catalyzator means can be destroyed if the invention is not utilized.

According to the invention the motor is also provided with a control system 13 which is connected between the injection system 4 and the fuel injection valves 5 of said system, and which will now be described in more detail.

The motor may be an Otto motor or a Diesel motor having injection valves 5, but the invention is likewise useful for carburettor motors, whereby a valve for each cylinder determines the amount of fuel to be sucked into the cylinder together with the air from the mixing chamber. In the illustrated case the motor is of the six-cylinder type, but the invention is also useful in motors having lesser or more cylinders.

The electronic injection system is of conventional type and is formed with means for measuring the temperature of the intake air, the temperature of the ambient air, the temperature of the water in the motor, the air pressure and the amount of admitted air. By means of said information the injection system can normally provide an effective and correct injection of air according to the optimum fuel/air mixture.

In the present case, whereby part combustions are intended to be excluded so that the fuel supply to special cylinders is blocked in certain situations, the special control system 13 has to be connected between the electronic fuel injection system and the injection valves 5 provided in the motor.

For the intended function the following incoming information to the control and guide unit is needed:

(a) speed signal (A) from each wheel;
(b) injection signal (D) from the injection system;
(c) synchronization signal (E) from a predetermined position of the ignition order;
(d) part load signal (F), i.e. the position of the throttle pedal;
(e) reference signal (G) for each combustion, which is utilized as a revolution speed signal; and
(f) input signal (B) from the lamda probe.

After said information has been treated the calculation and control unit delivers the following signals:

(g) first output signals (H) to each fuel injection valve; and
(h) second output signal (C) to the injection system for simulating the lambda signal in order to avoid a too large fuel injection in those cases, when certain injection valves 5 are blocked in their closed positions.

Generally the control system 13 comprises sensors for observing the rotational or peripheral speeds of the driving and the idle running wheels, an electronic calculation and control means 14, means for determing the closing and opening moments for the injection valves or nozzles, and an electronic unit overbridging the injection system.

The sensors may be any known means for observing the speeds of the respective wheels, for instance magnetic bodies 8 mounted concentrically with the wheels and sensor bodies 9 which are fixed mounted on the vehicle and which actuated by the magnetic bodies 8 get an indication of the rotational speeds of the wheels. Preferably sensor means of the type are utilized which are presently installed for locking free brakes, e.g. ABS brake sensors. Two of the sensors 8a, 9a are mounted at the driving wheels and the two other sensors at the idle running wheels. Via conduits A the signals from the sensors are transmitted to the electronic calculation and control means 14, in which a calculation is made of the skidding by dividing the speed of the driving wheels with the speed of the idle running wheels.

For enabling an effective and correct control of the choking of the fuel supply according to the above discussed combustion or choking chain a control chain has been predetermined, which may comprise two or several part combustions. If there is no need for more than a course controlling it may be sufficient to set a chain of two, three or four part combustions, if a finer grading is desired it is possible to utilize a larger number of part combustions for the chain, perhaps as much as twenty-four part combustions or even more. This chain is stored in the control unit 14 and is programmed such that a successively increasing number of part combustions are inhibited until the skidding has ceased or has returned to a predetermined acceptable value.

The skidding value forms the basis of the following function, and when the skidding has exceeded a predetermined value the calculation and control means starts to function.

In order to obtain a useful value a so called friction value is measured and calculated, which value corresponds to an acceptable or even desired wheel spin between the tire and the roadway. This value is obtained in that the torque of the motor is measured by means of the speed and the part load (the throttle set) of the motor and the wheel speeds. By comparing the wheel speed and the motor speed the total exchange value can be measured, and thereby the peripheral force of the drive wheels can be determined. By means of the peripheral force of the drive wheels, the normal axle pressure and possibly the spin of drive wheels the actual friction coefficient (the friction value) between the tires and the road is determined. This value forms basis for the determining of the allowed spin value.

For obtaining the best lateral stability and at the same time an optimum drive force ability the allowable spin is to vary following the friction value. Thus, the actual friction value determines the actual spin limit, and said limit is continuously measured while the vehicle is driven and is transmitted to the calculation and control means. Thereby consideration is continuously taken to the actual road condition, like the presence of water, ice, mud etc on the roadway. If the actual wheel spin is greater than the actual spin limit there has to be an effective reduction of the motor torque by inhibiting part combustions of the chain of part combustions.

On normal driving without any skidding or with a skidding below the predetermined limit value the signals of the injection system pass intact through the control unit 14 and said signals assist in opening and closing respectively the valves 5 on exactly correct moment for injection of the correct amount of fluid.

If, on the contrary, the skidding exceeds the predetermined code value the control unit 14 issues a signal stopping the injection to a first cylinder according to the chain of combustions. This happens at the same time as the valve closes following the just preceding injection, so that no amount of fuel has a possibility of entering the manifold outside the injection valves of the motor. If the skidding does not cease a further injection valve is blocked at the next step etc. until the skidding has ceased.

The choking of the valves in the chain of combustions should follow a certain pattern so that the the valve blockings are suitably distributed. If the chain of combustions includes four part combustions 1-2-3-4 the first blocking can be made at combustion 1, the second at combustion 3, the third at combustion 4 and the fourth at combustion 2, that is according to the system: * * * * -, 0 * * * - 0 * 0 * - 0 * 0 0 - 0 0 0 0 which corresponds to 100%, 75%, 50%, 25% and 0% combustion.

By way of further example, if a chain of combustions include ten part combustions, whereby each valve blocking is equivalent to 10% reduction of the torque, and whereby the valve blockings are distributed to give an optimum even distribution, e.g. by blocking the valves in the following sequence:

90% blocking part combustion 1
80% blocking part combustions 1+8
70% blocking part combustions 1+5+8
60% blocking part combustions 1+3+5+8
50% blocking part combustions 1+3+5+7+8
etc.

It is important, especially for motors having a catalytic exhaust gas cleaner, that no un-combusted fuel is allowed to enter the exhaust gas system, and to prevent this it is foreseen that each separate fuel injection nozzle or valve is closed synchronously with the closing of the inlet valve. In the control unit there has to be both a synchronization signal which makes the unit operate synchronously with the ignition order of the motor, and also a reference signal which determines the position of the inlet valve so that the injection nozzle or valve can be closed at exactly correct moment synchronously with the closing of the inlet valve.

When any part combustion is inhibited the actual cylinder pumps only air into the exhaust gas system and this may adversely influence the catalystic cleaner. In this situation the lambda probe 10 which measures the oxygen content of the exhaust gases will indicate a false fuel/air relationship, and in order to prevent the injection system from increasing the amount of injected fuel the lambda probe 10 is connected to the control unit 14 by a conduct, and the control unit 1B is adapted to issue a simulated lambda probe signal to the fuel injection system over the conduit C, whereby this problem is avoided.

In FIG. 2 the conduit D refers to the injection signal of the injection system, which signal is received and is treated by the calculation and control unit; the conduit E refers to the synchronization signal of the ignition order; the conduit F refers to a digital or analogous load signal (throttle opening); and the conduit G refers to a special reference signal for the position of the injection valve for each cylinder. By conduits H the control unit 14 is connected to each injection valve which is preferably electrically operated for providing a quick and effective opening, closing and inhibition respectively.

Figure 3:
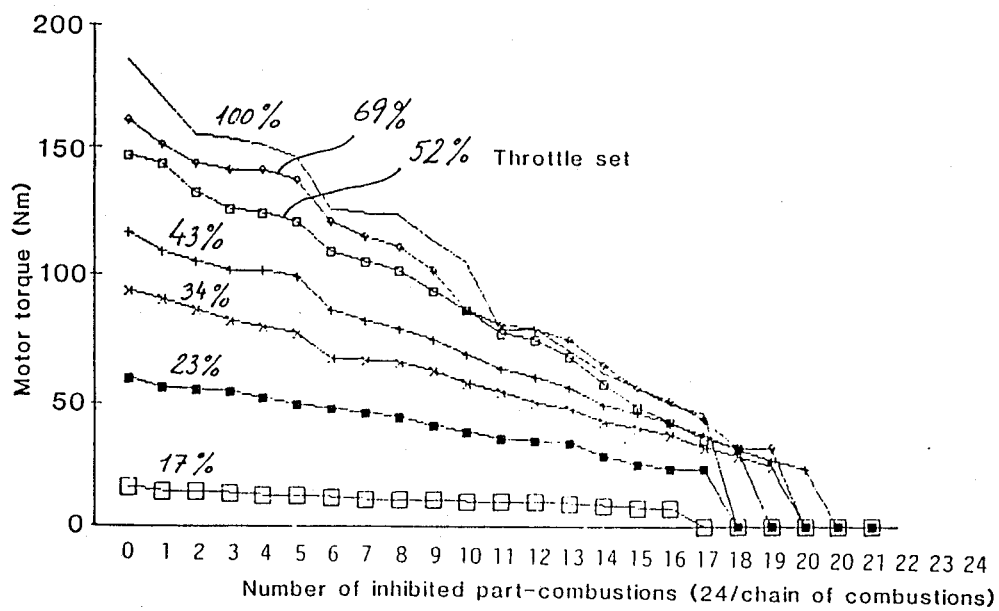
FIG. 3 is a diagram showing the torque reduction in a motor utilizing the system according to the invention and for an increasing number of choked part combustions.

FIG. 3 diagrammatically discloses the function of the apparatus according to the invention. The diagram shows the situation for seven different part loads (throttle positions) and for a part combustion chain including 24 combustions. The torque of the motor is plotted along the vertical axis and the number of inhibited part combustions is plotted along the horizontal axis, however without indicating the ray or order of the inhibited combustions. It is obvious that the torque of the motor decreases relatively regularly following an increasing number of inhibited part combustions up to about 17 inhibited combustions, whereafter the torque is decreased drastically towards zero, first for a low throttle opening, then successively for greater throttle openings.

We claim:

1. A method of preventing unacceptable wheel spinning and subsequent lateral sliding of a vehicle which includes driving and idle running wheels; an engine having combustion cylinders fired in an ignition order, and inlet and exhaust valves; and an air and fuel supply means including a throttle for sequentially supplying an optimum amount of air and fuel to each one of said cylinders comprising the steps of:

A. determining a maximum acceptable wheel spinning limit value;
B. determining an actual wheel spinning value by comparing the rotational speed of said driving wheels with the actual rotational speed of said idle running wheels;
C. comparing said acceptable wheel spinning limit value with said actual wheel spinning value and if the latter is higher than the former; then
D. completely inhibiting the supply of fuel to one or more of said cylinders while simultaneously continuing to supply said optimum amount of air and fuel to all of the non-inhibited cylinders; and
E. successively increasing the number of said completely inhibited cylinders to reduce the torque output of said engine until said actual wheel spinning value equals or is lower than said acceptable wheel spinning value.

2. The method according to claim 1 wherein said air and fuel supply means comprise a fuel injection system including a injection valve for each cylinder and said method includes further steps of:

F. defining a constant chain of combustions for said engine;
G. determining a predetermined number of part-combustions within said constant chain of combustions; and
H. performing steps D and E by inhibiting first one and then successively increasing the number of said part-combustions in said defined constant chain of combustions that correspond to specifically defined cylinders of said engine.

3. The method according to claim 2 comprising the additional step of:

I. selecting said part-combustions to be inhibited in step H so that they are as evenly distributed as possible within said defined constant chain of combustions and adjusting said distribution to remain even when the number of said part-combustions is increased.

4. The method according to claim 2 wherein said number of part-combustions according to step G is at least four.

5. The method according to claim 2 wherein said number of part-combustions according to step G is more than ten.

6. The method according to claim 2 wherein said inhibiting of part-combustions is allowed to increase until 70% of the fuel supply for said combustion chain has become inhibited independently of the setting of said engine throttle.

7. The method according to claim 2 wherein in step H said inhibiting of said fuel supply for a cylinder selected for inhibition is accomplished by closing said injection valve for said selected cylinder synchronously with the closing of the inlet valve associated with the cylinder which just precedes said selected cylinder in the ignition order of said engine.

8. The method according to claim 2 wherein said air and fuel supply means includes a lambda probe for sensing the oxygen content in the exhaust gas of said engine and sending an input signal indicative of said oxygen content to cause said fuel injection system to increase or decrease fuel to maintain said optimum air and fuel supply and comprising the further steps of:

J. blocking said lambda probe input signal when any part-combustion is inhibited and K. generating a simulated lambda probe input signal and transmitting said simulated input signal to said fuel injection system to prevent said fuel injection system from increasing the supply of fuel to said engine during inhibition.

9. An apparatus for preventing unacceptable wheel spinning and subsequent lateral sliding of a vehicle which includes: driving and idle wheels; an engine having combustion cylinders fired in an ignition order, and inlet and exhaust valves; and an air and fuel supply means including a throttle for sequentially supplying an optimum amount of air and fuel to each one of said cylinders; comprising a calculation and control means having means for determining a maximum acceptable wheel spinning limit value;

means for determining an actual wheel spinning value by comparing the actual rotation speed of said driving wheels with the actual rotational speed of said idle running wheels;

means for comparing said acceptable wheel spinning limit value with said actual wheel spinning value and if the latter is higher than the former generating a wheel spinning signal;

means responsive to said wheel spinning signal for completely inhibiting the supply of fuel to one or more of said cylinders while simultaneously continuing the supply of said optimum amount of air and fuel to all of the non-inhibited cylinders and means for successively increasing the number of said inhibited cylinders to thereby reduce the torque output of said engine until said actual wheel spinning value equals or is lower than said acceptable wheel spinning value.

10. An apparatus according to claim 9 wherein said air and fuel supply means comprises a fuel injection system for sequentially supplying an optimum amount of air and fuel to each one of said engine cylinders, said injection system including fuel injection valves, a lambda probe input for receiving a lambda signal indicative of the oxygen content of the engine exhaust gases including means for adjusting fuel injection volume in response thereto, a fuel injection signal for each of said injection valves, a synchronization signal, a throttle position signal and a rotation speed reference signal; and wherein said calculation and control means is operatively connected between said fuel injection system and said fuel injection valves and further includes:

a means for receiving and transmitting or blocking said fuel injection signal to said injection valves;

a means for receiving and coordinating said synchronization signal from said fuel injection system for each particular position of said ignition order;

a means for receiving and coordinating said rotation speed reference signal from said fuel injection system;

a means for receiving said lambda signal and either transmitting said lambda signal to said fuel injection system or blocking transmission of said lambda signal; and said means for completely inhibiting the supply of fuel to one or more cylinders including means for calculating and transmitting a first output opening signal that will allow transmission of said injection signal to each of said fuel injection valves that is to be opened or will block said injection signal from said fuel injection system for each of said fuel injection valves that is to be inhibited because of wheel spin and for calculating and transmitting a second output signal to said fuel injection system which simulates said lambda signal indicating an optimum air and fuel mixture when one or more of said injection signals are being blocked.

11. A control system according to claim 10 further including an electronic means for defining a chain of combustions and establishing at least four part-combustions within said chain of combustions by blocking transmission of said injection signals from said fuel injection system to said fuel injection valves for one or more of said cylinders when said wheel spinning limit value is exceeded and means for successively increasing the number of said injection signals that are blocked to successively increase the number of said part-combustions until said wheel spinning has been reduced to said acceptable wheel spinning value.

* * * * *